April 12, 1960  R. E. PHELON  2,932,447

FLYWHEEL FOR USE WITH AN INTERNAL COMBUSTION ENGINE

Filed May 7, 1958

INVENTOR
RUSSELL E. PHELON
BY Teller & McCormick
ATTORNEYS

United States Patent Office 2,932,447
Patented Apr. 12, 1960

2,932,447

FLYWHEEL FOR USE WITH AN INTERNAL COMBUSTION ENGINE

Russell E. Phelon, Longmeadow, Mass.

Application May 7, 1958, Serial No. 733,532

2 Claims. (Cl. 230—135)

The invention relates to a flywheel adapted for use with an internal combustion engine and the invention relates more particularly to such a flywheel also adapted for use with or as a part of a magneto for said engine.

A flywheel of the type mentioned is frequently provided with radial fins or blades which serve as an air impeller to circulate air for cooling purposes. The general object of the invention is to provide a flywheel having air circulating fins or blades specially shaped to increase the rate of air flow and to provide a substantially increased flywheel or inertia effect.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 1:
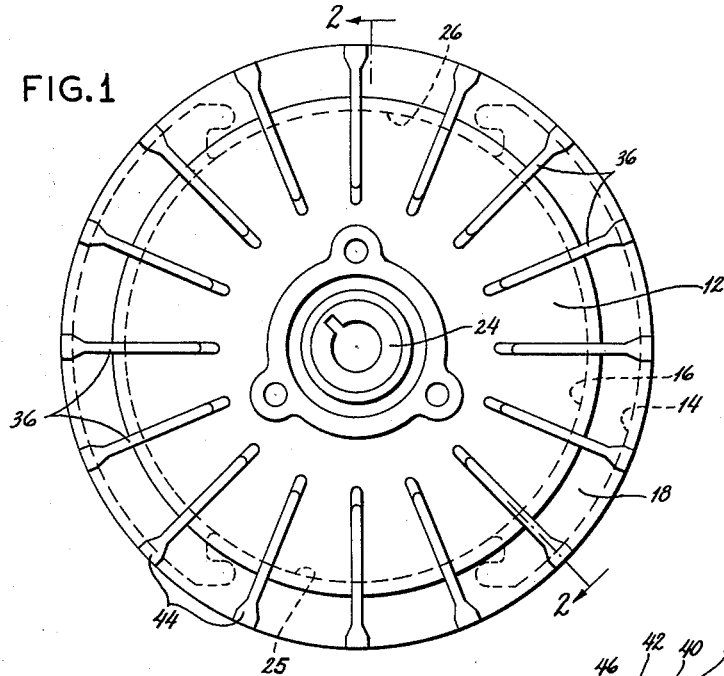
Fig. 1 is a front view of a flywheel embodying the invention.
Figure 2:
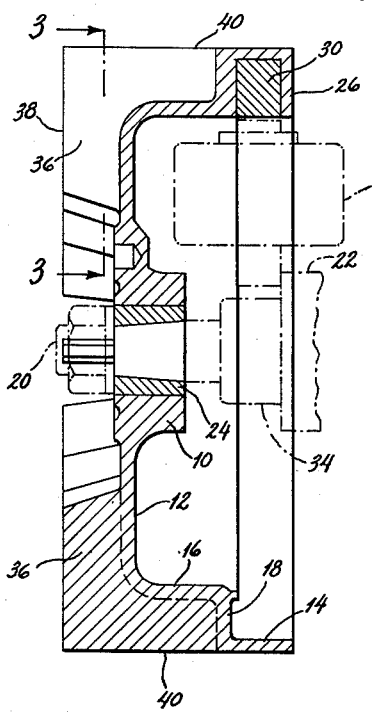
Fig. 2 is a vertical sectional view of the flywheel, this view being taken along the line 2—2 of Fig. 1 and showing associated parts in dot-and-dash lines.

Referring to the drawing, a flywheel embodying the invention is an integral casting which includes a hub 10, a generally radial web 12, and an annular peripheral flange extending from the web in one longitudinal direction, that is, toward the right. As shown, the peripheral web comprises an outer annular portion 14 and an annular portion 16 spaced inwardly from said outer portion, the last said portions being connected by a radial annular web 18. The flywheel is preferably cast from an aluminum or magnesium alloy, but the invention is not so limited.

The flywheel is adapted to be mounted on a horizontal shaft 20 rotatable in a stationary bearing bushing 22. The hub 10 of the flywheel has a bushing 24 cast in place therein which bushing tightly fits said shaft 20.

Although not essential to the invention, the flywheel is shown as having at least one boss 25 near the periphery and joined with the flange portion 14 and with the web 18. There may be a similar opposite boss 26. At least one of said bosses, such as 26, has one or more permanent magnets 30 cast in place therein. The boss 26 and the magnet 30 have a common inner face which conforms to a cylindrical surface concentric with the flywheel axis. The magnet 30 is adapted to cooperate in a known manner with a stator which is shown at 32 by dot-and-dash lines, and with a breaker mechanism which is not shown but which is operated by a cam 34 on the shaft 20. The stator and the breaker mechanism do not, of themselves, constitute any part of the invention and further description is unnecessary.

The flywheel includes a plurality of similar generally radial fins or blades 36, 36 which are cast integrally with the other described flywheel parts, these fins or blades extending from the web 12 in the longitudinal direction opposite to that of the flange, that is, toward the left or front. When the main flange comprises the portions 14, 16 and 18, each blade is joined not only to the web 12 but also to the flange portions 16 and 18. Said fins or blades are uniformly spaced circumaxially and they serve as fan or blower blades to circulate air for cooling purposes. Said fins or blades also serve to provide added mass which increases the inertia effect of the flywheel. The number of fins or blades may be varied, but the drawing shows sixteen of them.

Each blade 36 has a left or front edge face 38 in or approximately in a radial plane and each blade 36 has an approximately flat outer or peripheral face 40 parallel with, or approximately parallel with, the axis of rotation. Each of said blades 36 is substantially thicker at its peripheral end than at its inner end. The side faces of each blade 36 meet the flat outer face 40 at sharp angles or corners 42, 42.

Figure 3:
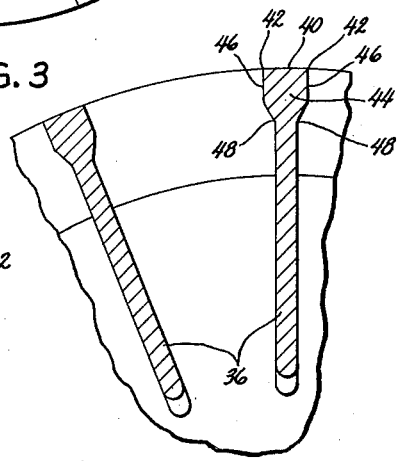
Fig. 3 is an enlarged fragmentary sectional view taken along the line 3—3 of Fig. 2.
Figure 4:
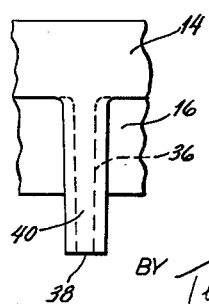
Fig. 4 is a fragmentary plan view on the same scale as Fig. 3.

The greater thickness of each blade at its peripheral end is preferably attained by providing said blade at its said end with an integral radially narrow enlargement 44. As shown in Fig. 3, the enlargement 44 has parallel sides 46, 46 and it has a thickness on the order of twice the thickness of the main portion of the blade, but as to this the invention is not narrowly limited. Said enlargement 44 is symmetrical with respect to the central plane of the blade, and its outer face is coincident with the outer face 40 of the blade. The parallel sides 46, 46 of the enlargement meet the outer face 40 to provide said sharp corners 42, 42. Said parallel sides 46, 46 of the enlargement are shown as being relatively narrow and as having a width slightly greater than the thickness of the main portion of the blade. Said sides of the enlargement 44 are joined by smooth curves 48, 48 with the sides of the main portion of the blade.

The several blades 36, 36 with their thicker outer portions collectively constitute a centrifugal blower or air impeller, the space between each two adjacent blades constituting a passage for the radially outward movement of air. By reason of the greater thickness of the blades 36 at their peripheral ends, the radial discharge velocity of air moving outwardly between each two immediately adjacent blades is substantially greater than it would be if said blades had uniform thickness throughout their length.

When the blades have enlargements such as 44, 44, the passage between each two blades has a progressively increased width until the enlargements 44, 44, are reached. By reason of said enlargements, the width of the passage does not continue to increase and may even be slightly decreased. In any event, the air discharge velocity between the enlargements and at the peripheral end of the passage is considerably greater than it would be without the enlargements.

It is a well-known principle of fluid flow, whether of liquids or of gases, that under otherwise identical conditions the rate of flow from an orifice is greater when the orifice has a sharp-cornered peripheral edge than when the orifice has a rounded peripheral edge. This principle is utilized in the present invention to increase air flow. The greater thicknesses of the blades at the periphery maintain a relatively high discharge velocity for the air, and the sharp corners 44, 44 cooperate with said greater thickness to insure a maximum rate of flow.

The greater thicknesses of the blades at their peripheries, particularly the enlargements 44, 44, not only increase the rate of air flow, but they also serve to increase the inertia effect of the flywheel. The inertia effect of any rotating mass increases with the square of its distance from the axis, and said enlargements 44, 44 are at the maximum distance from the axis.

The invention claimed is:

1. An integrally cast flywheel rotatable about a central longitudinal axis and adapted for use with an internal combustion engine, said flywheel comprising a central hub and a radial web connected with the hub and a peripheral flange extending from the web in one longitudinal direction and also comprising a plurality of similar generally radial blades extending from the web in the opposite or front longitudinal direction and uniformly spaced circumaxially to define radial passageways therebetween, each of said blades having a front edge face and a peripheral edge face and each of said blades having a radially narrow enlargement symmetrical with respect to a radial plane passing through its center and having parallel sides which enlargement extends inwardly from said peripheral edge face to define therebetween continuations of the radial passageways the maximum width of which does not exceed the maximum width of said radial passageways whereby the radial discharge velocity of air moving outwardly between the enlargements on each two immediately adjacent blades is substantially greater than it would be if the blades had uniform thickness throughout their length.

2. A flywheel as set forth in claim 1, wherein said peripheral edge face of each blade is approximately flat, and wherein the said faces of each enlargement meet said peripheral edge face to provide sharp corners for augmenting the flow of air between each two immediately adjacent blades.

References Cited in the file of this patent

UNITED STATES PATENTS

| | | |
|---|---|---|
| Re. 23,146 | Packwood | Sept. 13, 1949 |
| 1,166,257 | Rees | Dec. 28, 1915 |
| 1,169,476 | Gramlich | Jan. 25, 1916 |
| 1,237,007 | Wilstam | Aug. 14, 1917 |
| 2,083,996 | Jonn | June 15, 1937 |
| 2,737,898 | Andermatt | Mar. 13, 1956 |